United States Patent [15] 3,705,334
Arens et al. [45] Dec. 5, 1972

[54] APPARATUS FOR DETERMINING TRANSPOSED COMPONENTS OF A VECTOR

[72] Inventors: Egidius Arens, Achim; Dieter Muller-Lindemann; Karl-Friedrich Triebold, both of Bremen, all of Germany

[73] Assignee: Fried Krupp Gesellschaft mit beschrankter Haftung, Essen, Germany

[22] Filed: Dec. 20, 1971

[21] Appl. No.: 209,657

[30] Foreign Application Priority Data

Dec. 23, 1970 Germany....................P 20 63 471.3

[52] U.S. Cl...................................317/231, 317/230
[51] Int. Cl..............................................H01g 9/00
[58] Field of Search..............317/230, 231, 232, 233

[56] References Cited

UNITED STATES PATENTS 3,196,324 7/1965 Suetzer...............................317/231
3,457,466 7/1969 Larkam...............................317/231
3,549,957 12/1970 Weininger...........................317/231

*Primary Examiner*—James D. Kallam
*Attorney*—Spencer and Kaye

[57] ABSTRACT

An apparatus for reproducing a two-dimensional vector and determining its transposed components in a given coordinate system. Voltages proportional to the cartesian components of the vector are applied to groups of aligned electrodes cooperating with a common electrolyte so as to electrolytically reproduce the vector by means of the resulting electric field. The transposed components of the thus reproduced vector are then detected by means of a pickup arrangement including at least three sensors which can be arbitrarily oriented in the plane of the reproduced vector.

15 Claims, 8 Drawing Figures

APPARATUS FOR DETERMINING TRANSPOSED COMPONENTS OF A VECTOR

BACKGROUND OF THE INVENTION

The present invention relates to an apparatus for reproducing a two-dimensional vector from its cartesian components and for thus determining the transposed components of the reproduced vector in a transposed coordinate system with an arbitrarily given orientation in the plane of the reproduced vector.

It is often necessary in order to solve a particular problem to transpose the two cartesian components of a vector into a cartesian coordinate system which has been rotated by a given angle with respect to the original cartesian coordinate system or even into a transposed noncartesian, oblique coordinate system. The two-dimensional vector of an electrical field can be reproduced in a known manner by voltages which are proportional to its two cartesian components.

Devices are known for reproducing and transposing a vector in a cartesian coordinate system in which two voltages which are proportional to the two cartesian components of the vector respectively are applied to a system of perpendicularly arranged coils whose resulting vector of magnetic induction reproduces the original vector in its cartesian components. By means of a second pair of coils disposed in the plane of the reproduced vector, which second pair of coils are rotatably mounted and perpendicular with respect to one another, a transposed cartesian coordinate system is defined according to the positional orientation of the second pair of coils to the reproduced vector. The individual voltages induced in the rotatably mounted pair of coils which are detected via slip ring contacts, thus correspond to the transposed, cartesian coordinates of the reproduced vector. Such an arrangement is shown, for example in U.S. Pat. No. 3,546,666, issued to G. H. Ziehm et al. on Dec. 8th, 1970.

In the device disclosed in the above mentioned patent, the position of the movable pair of coils is always oriented with respect to the direction of the earth's magnetic north pole by means of a compass needle fastened to the axis of the movable pair of coils, regardless of how the other stationary coil system is aligned at the moment with respect to this direction. Consequently the reproduced vector is always separated or divided into cartesian components in the direction to the earth's magnetic north pole and vertically thereto, whereby the components of the original vector are transposed. Erroneous measurements occurring in this type of system due to friction in the bearings of the rotatably mounted pair of coils and the slip ring contacts for obtaining the voltage can be considerable, however, since only with large deviations does the force of the magnetic field of the earth on the compass needle becomes large enough to overcome the initial static friction.

SUMMARY OF THE INVENTION

It is therefore the object of the present invention to provide an apparatus in which a vector can be reproduced and which permits the use of a pickup system which can be oriented at will in the plane of this reproduced vector and which is so arranged and mounted and whose voltages are coupled out in such a manner that the above-described faults and drawbacks are eliminated.

The above object is accomplished according to the present invention by means of an apparatus including a vessel filled with electrolyte. The vessel is constructed of an electrically non-conductive material and has two perpendicularly aligned pairs of opposed groups of adjacent linearly aligned rod-shaped electrodes which extend into the electrolyte. The respective alignment axes along the frontal faces facing the electrolyte of the groups of electrodes of each pair being parallel so as to outline an area in a plane within the vessel. The electrodes of each group are galvanically connected together outside of the electrolyte. Voltages proportional to the two cartesian components of the vector to be reproduced are fed to respective ones of the pairs of groups of electrodes. A pickup means including at least three galvanically unconnected sensors which extend into the plane of the reproduced vector is provided and the pickup means is mounted within the vessel so that the sensors can be moved relative to the vessel in the plane of the reproduced vector. The voltages proportional to the transposed components are provided as potential differences between two pairs of associated sensors via a decoupling means.

It is principally not novel to reproduce an electrical field in an electrolyte. This is done, for example, within the scope of the model building art in the high voltage measuring field. Electrolytic energy and signal transmission is also being used in other areas of the electrical art and has been described in connection therewith, e.g., in connection with the drives for certain types of gyrocompasses. However, the fact that it is possible to transpose vectors by means of electrolytic processes and that this can be done more advantageously than through the use of electromagnetic devices, which is in the state of the art, is novel and the object of the present invention.

In the solution of the present invention, the voltages which are proportional to the cartesian coordinates of the vector to be reproduced produce an alternating electrical field in the electrolyte whose resulting vector depends, in its magnitude and direction, on the size of the applied voltages and thus reproduces the original vector. When a special electrolyte is used, it is also possible to reproduce a direct field. A plurality of individual electrodes of, for example, circular cross section whose frontal faces are small compared to the dimensions of the vessel are combined galvanically into a group outside of the electrolyte and the groups are arranged at right angles to one another so that they form a rectangle, or more particularly, a square in the case of cartesian coordinates. Two oppositely disposed groups of electrodes constitute a pair so that when each of the two voltages which are proportional to the two cartesian coordinates is fed to a respective pair of groups of electrodes, a practically homogeneous electrical field is produced, except for distortions in the field in the vicinity of the individual electrodes.

In a known manner it is possible to measure the potentials in this field by means of sensors in the form of, for example, metallic electrodes. The problem at hand, i.e., transposing the cartesian coordinates of the vector of the electrical field into a transposed cartesian or oblique coordinate system of arbitrary orientation, is now effected according to the present invention by the pickup system disposed in the electrolyte in the plane of the vector which system comprises at least three electrically insulated, i.e., galvanically unconnected, sensors. The sensors are mounted on a nonmetallic carrier, preferably having a circular cross section, to form a structural unit which is rotatably mounted with one axis in a point suspension in the center of the vessel and thus in the center of the plane in which the vector is reproduced. Consequently, the axis will not produce field distortions since it lies in a plane of identical potential.

The type of transposing accomplished by the pickup means or system is dependent on the arrangement of the sensors and the orientation of the pickup means in the plane of the vector. The desired orientation of the pickup system is effected via the axis of rotation of the unit comprising the carrier and sensors in that the unit is rotated about its axis by a desired angle causing the coordinate system provided by the sensors to be shifted by such angle with respect to the cartesian coordinate system provided by the pairs of electrodes.

Preferably, the unit comprising sensors and carrier therefore is disposed in the electrolyte and is so dimensioned that it has a degree of buoyancy in the electrolyte so as to reduce the bearing friction.

As mentioned above, at least three sensors must be used to provide the components of the transposed vector, which components are dependent on the arrangement of the sensors. When three sensors are used which are arranged on the carrier at the corners or vertices of an isosceles triangle, the transposed components of the reproduced vector are given, according to the position of the pickup system, by the potential differences between the sensor at the vertex of the angle enclosed by the two equal sides of the triangle and the respective sensor at each of the two other corners of the triangle respectively. If the angle between the two equal sides is 90°, a cartesian component transposition results which is oriented according to the orientation of the pickup system with respect to the associated pairs of electrodes. If the angle is other than 90°, the transposition of the components will be oblique.

When a pickup system is employed which has four sensors which define the corners of a rectangle whose center lies in the axis of the carrier, the transposed components of the reproduced vector are provided, according to the position of the rectangle with respect to the pairs of groups of electrodes, as potential differences between the diagonally opposite sensors. In the special case of a square arrangement of the sensors, the components transposition is cartesian.

In order to avoid field distortions caused by the sensors, according to a feature of the invention, the sensors are either fastened as metallic dots in the plane of the reproduced vector on a carrier of the same specific conductivity as the electrolyte or the sensors are thin metallic rods which extend into the plane of the reproduced vector substantially perpendicular thereto. Experiments have shown that the resulting field distortions are negligibly small in either case.

According to a further feature of the invention, the potential differences at the associated sensors are not decoupled as voltages via slip ring contacts as is conventional in the art, but rather are transmitted electrolytically via respective decoupling arrangements. Each decoupling arrangement includes an annular decoupling element and an associated planar decoupling element or of two associated annular, metallic decoupling elements between which there is an electrolyte. Advisably the annular decoupling elements are fastened to the axis of the carrier for the sensors and are each galvanically connected with a separate sensor, while each associated decoupling element is permanently connected with the vessel holding the groups of electrodes. To simplify the construction, it is preferable to use only one electrolyte for the entire system. In such a case, undesirable coupling through the electrolyte from one decoupling arrangement to the adjacent one and to the sensors is avoided by appropriately spacing the decoupling arrangements so that the distance between the decoupling elements of one decoupling arrangement through the electrolyte is short compared to the distances between adjacent decoupling arrangements from one another and from the sensors.

The entire device can be made symmetrical in the case of a four sensor pickup arrangement in that two decoupling arrangements are adjacently fastened symmetrically to the plane in which the vector is reproduced. The electrolytic path between one decoupling arrangement and the adjacent one is again selected to be much larger than the path through the electrolyte from one decoupling element to its associated decoupling element.

The electrolytic transmission of a potential via the decoupling arrangements of the invention results in the advantage that the decoupling takes place in such a manner that the heavy friction encountered with a pickup using slip ring contacts is avoided. Since additionally the carrier together with its pickup system has a certain degree of buoyancy in the electrolyte if it is appropriately dimensioned, the bearing friction is also low.

If the vessel with its pairs of electrodes can be rotated, for example with respect to a reference direction to the earth's magnetic north pole, and the reproduced vector is intended to be separated into components with respect to this direction and at an angle thereto, the desired transposed components are provided by rigidly fastening a rod or bar magnet to the carrier for the pickup system sensors. The longitudinal axis of the rod magnet is positioned parallel to the plane of the reproduced vector and a line drawn through two associated sensors whereby the coordinate system provided by the sensors is always aligned with one axis to the earth's magnetic north pole independent of the position of the pairs of groups of electrodes with respect to this direction.

In addition to the advantages of broadbandedness, the possible reproduction of direct and alternating fields and the low friction compared to devices according to the state of the art, a further advantage of the apparatus according to the present invention for the last-mentioned case of application lies in the fact that the vector of the electrical field to be measured cannot be influenced in the electrolyte by the magnetic field of the movable rod magnet which can be arranged anywhere within or outside of the electrolyte. Conversely with the above-mentioned devices according to the state of the art, the reproduced vector can be interfered within the form of magnetic induction by the magnetic field of a strong permanent rod magnet which must be used instead of the weaker compass needle because considerable masses must be moved due to a deviation of the vector of the magnetic field of the earth and the momentary alignment of the rod magnet.

DESCRIPTION OF THE PREFERRED EMBODIMENTS

Figure 1:
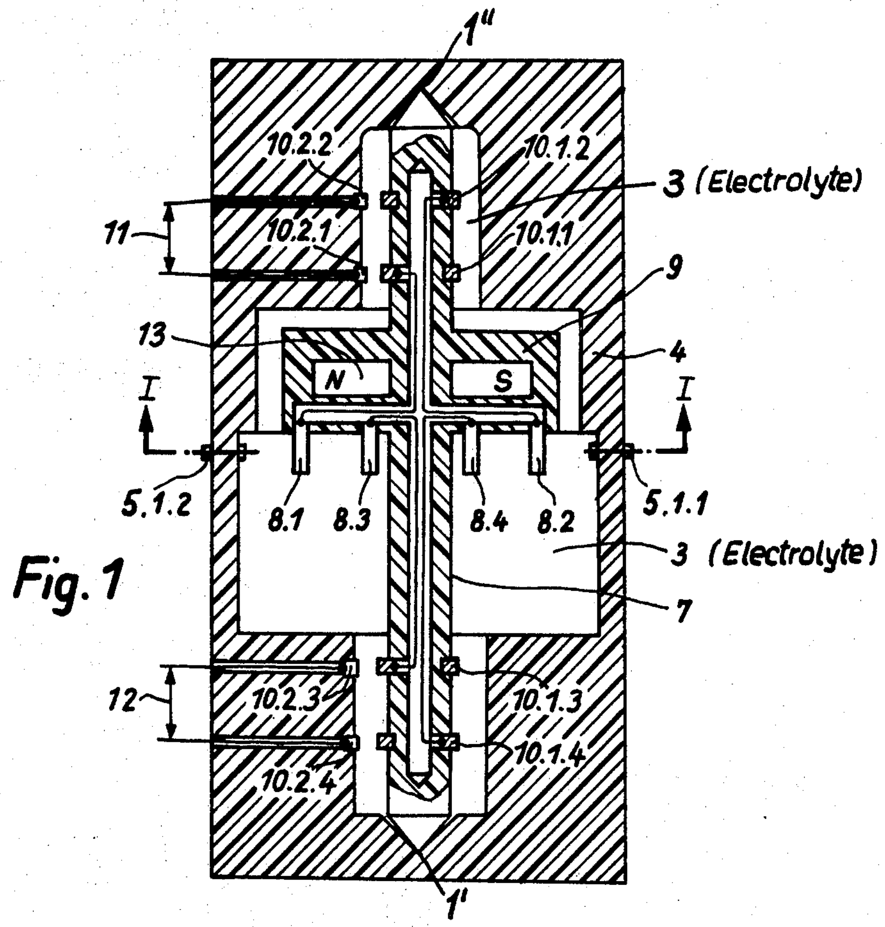
FIG. 1 is a schematic sectional elevation view of the apparatus of the present invention for a transposition of cartesian coordinates using a pickup system with four sensors.
Figure 2:
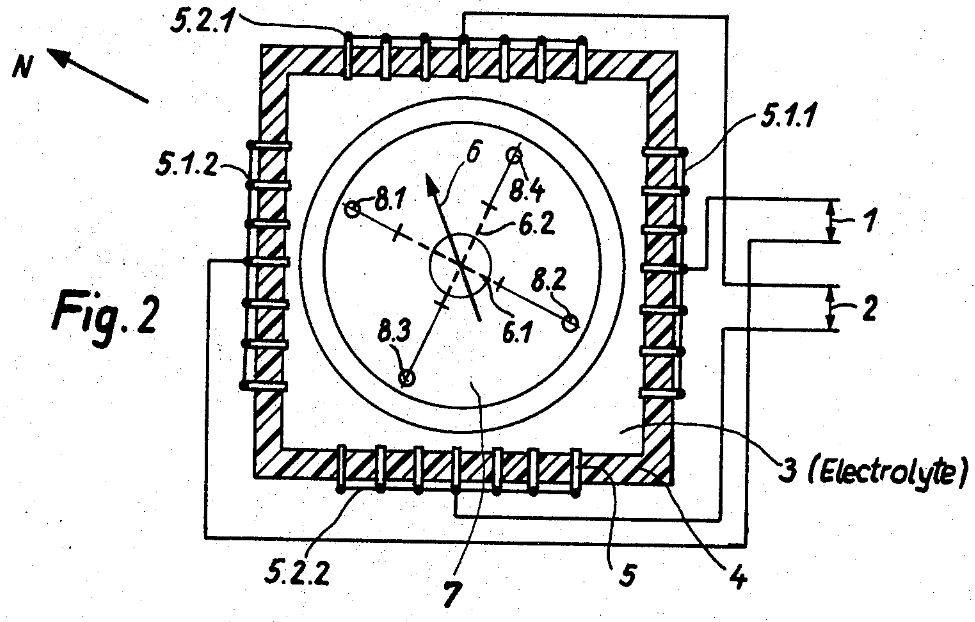
FIG. 2 is a sectional plan view of the apparatus of FIG. 1 along the line I—I.

FIGS. 1 and 2 are sectional views of the basic apparatus according to the present invention for reproducing any desired two-dimensional vector whose cartesian components are represented by voltages 1 and 2 (see FIG. 2) and for transposing the cartesian components of the reproduced vector into any desired cartesian coordinate system. Reference numeral 4 is a sealed vessel which is formed of a non-conductive material, e.g., a plastic material, and as illustrated has a square cross section. The interior of the vessel is filled with an electrolyte 3. The electrolyte 3 is for instance a magnaninic solution with alcohol and water or with ethylene-glycol and water for reproducing alternating electric fields. Reproducing a direct field the electrolyte 3 is for example a mixture of methanol and formaldehyde together with water.

Mounted in each of the four walls of the vessel 4 at the same relative height is a group of linearly aligned rod-shaped electrodes 5.1.1, 5.1.2, 5.2.1, or 5.2.2, respectively. The individual electrodes of each group extend into the interior of the vessel 4, and hence into the electrolyte 3, to the same extent, so that the alignment axes through the frontal faces of the electrodes of the groups on opposite walls, i.e., 5.1.1, 5.1.2 or 5.2.1, 5.2.2 are parallel to one another and all of such alignment axes lie in the same plane and thus define an area in such plane. On the exterior of the vessel 4, i.e., outside the electrolyte 3, the individual electrodes of each group are galvanically connected together. Two oppositely disposed groups of electrodes, i.e., 5.1.1, 5.1.2 or 5.2.1, 5.2.2, form a pair to which the voltage 1 or the voltage 2, which represent the cartesian components of the vector to be reproduced, is applied respectively. The application of the voltages 1 and 2 to the respective pair of groups of electrodes causes an electric field to be formed in the electrolyte 3 whose resulting vector 6 constitutes a reproduction of the original vector.

Centrally mounted within the vessel 4 by means of point suspensions 7′ and 7″ for rotation about an axis perpendicular to the plane defined by the groups of electrodes is a shaft 7. A plate shaped carrier 9 of a nonmetallic or nonconductive material, and preferably of circular cross section, is mounted on the shaft 7 for rotation therewith. In the illustrated embodiment the shaft 7 and the carrier 9 are formed from the same material and form a single structural unit.

Figure 8:
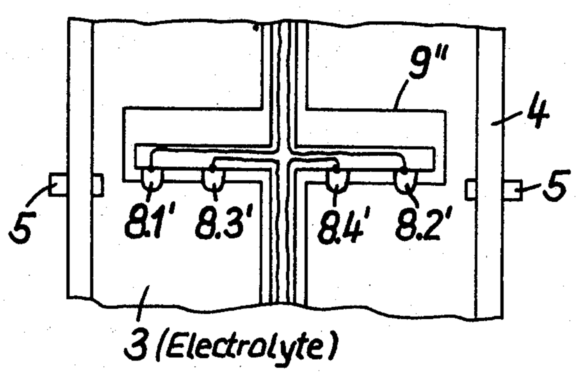
FIG. 8 illustrates a further arrangement for a pickup system with sensors which are fastened as metallic dots on a carrier.

The carrier 9, is provided in its lower surface with a plurality of metallic sensors which extend into the area of the plane defined by the groups of electrodes 5.1.1, 5.1.2, 5.2.1 and 5.2.2 and which constitute the pickup system for the apparatus. In the illustrated embodiment, four such sensors 8.1, 8.2, 8.3 and 8.4 are provided which as shown in FIG. 2 are arranged at the corners of a square and hence will provide cartesian components for the transposed vector. As further illustrated, the carrier 9 is mounted on the shaft 7 for rotation in a plane parallel to but spaced from the plane of the area outlined by the groups of electrodes and the sensors 8.1–8.4 are hence constituted by metallic rods which extend into the plane of the area defined by the groups of electrodes perpendicular thereto. It is to be understood however, that the carrier 9 may alternately be mounted for rotation within the plane defined by the groups of electrodes 5.1.1 ... 5.2.2 if desired, in which case the carrier should be constructed of a material having substantially the same specific conductivity as the electrolyte and the sensors 8.1–8.4 would be metallic dots. A carrier 9″ mounted in the plane of the electrodes 5 having sensors 8.1′, 8.2′, 8.3′ and 8.4′ in the form of metallic dots is shown in FIG. 8. If the vessel is filled with the above mentioned electrolyte 3 with a specific electrical conductivity of $10^{-3}$ (1/ cm) the material of the carrier 9″ is a composition of different oxides which are sintered.

In order to decouple the potentials detected by the sensors 8.1–8.4, an electrolytic decoupling arrangement is provided for each sensor. Each decoupling arrangement includes an annular metal element 10.1.1 to 10.1.4 which is mounted on the shaft 7 and is galvanically connected to one of the sensors 8.1 to 8.4 respectively, and an associated metal element 10.2.2 to 10.2.4 respectively, which may be annular if desired and which is fixedly mounted on the interior wall of the vessel 4. The space between the associated decoupling elements 10.1.1 to 10.1.4 and 10.2.1 to 10.2.4 respectively, is filled with the electrolyte 3. With the rectangular sensor arrangement illustrated in FIGS. 1 and 2, each of the two components of the transposed vector is determined by the potential differences between the pair of diagonally opposed sensors, i.e., between sensors 8.1 and 8.2 and between sensors 8.3 and 8.4. Accordingly, both for reasons of symmetry and for ease in detecting the desired voltage difference, the decoupling arrangements 10.1.1, 10.2.1 and 10.1.2, 10.2.2 for the sensors 8.1 and 8.2 respectively are disposed at one end of shaft 7 while the decoupling arrangements 10.1.3, 10.2.3 and 10.1.4, 10.2.4 for sensors 8.3 and 8.4 respectively are disposed at the opposite end of the shaft 7. The two potential differences are voltages 11 and 12 which, depending on the position of the pickup system 8, are proportional to two transposed components 6.1 and 6.2 of the vector 6.

The interior of the vessel 4 preferably has a circular cross section at the height of the carrier 9 with its rod-shaped sensors 8. The space between the wall of the vessel 4 and carrier 9 is selected to be just as small as the path through the electrolyte 3 from one decoupling element, e.g., element 10.1.1, to its associated decoupling element, e.g., 10.2.1.

If an orientation of the pickup system 8 to the earth's magnetic north pole is desired, this can be achieved by means of a rod magnet 13 which is mounted in the carrier 9 with its longitudinal axis arranged parallel to a line drawn between two diagonally opposite sensors, e.g., in the illustrated example parallel to a line extending between the two sensors 8.1 and 8.2, and to the plane of the electrodes 5. As a result of this orientation of the magnet 13 it is possible to separate the vector 6 into transposed components 6.1, 6.2 with reference to the earth's magnetic north pole by means of the pickup system 8. The voltages 11 and 12 then correspond to the transposed components 6.1, 6.2 of the reproduced vector 6.

When voltages 1 and 2 are applied in symmetry, e.g., with respect to a common zero potential, the axis of the shaft 7 is disposed in a potential plane at zero potential. When the four sensors 8.1 and 8.4 are arranged as shown in FIG. 1, the voltages 11 and 12 are then also in symmetry with respect to the zero potential. This symmetry has the advantage for use of the voltages 11 and 12 in circuit applications, that the position-dependent, unintended shifts and tilts due to bearing play will have no effect when, in the usual manner, the vector 6 is reproduced as a vectorial value for voltages 11 and 12 from its components 6.1 and 6.2 by means of summing and difference circuits.

Figure 3:
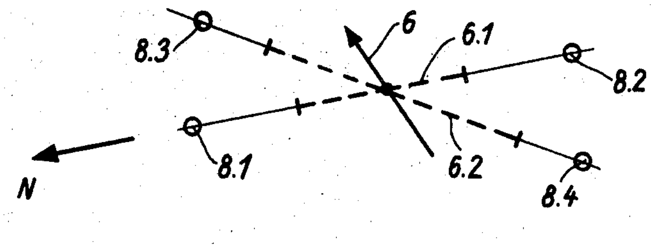
FIG. 3 illustrates a further arrangement for a pickup system with four sensors which can be used with the basic apparatus according to the invention.

FIG. 3 shows a modified arrangement for a pickup system 8 with four sensors 8.1 to 8.4 which are not arranged in a square and hence provides an oblique coordinate system. With this arrangement, voltages 11 and 12 correspond to the transposed oblique components 6.1, 6.2 of vector 6.

Figure 4:
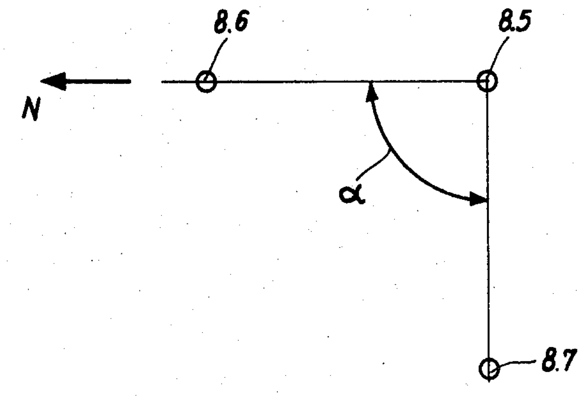
FIG. 4 illustrates a pickup system with three sensors arranged in the form of an isosceles triangle.

FIG. 4 shows an arrangement for a pickup system 8 which is in the form of an isosceles triangle with only three sensors 8.5, 8.6, 8.7 located at the corners or vertices of the triangle. With this sensor arrangement the potential differences are decoupled between sensor 8.5, which is located at the vertex of the triangle between the two equal sides thereof, and sensor 8.6 resulting in voltage 11, and between sensors 8.5 and 8.7 resulting in voltage 12. If the angle $\alpha$ between the two equal sides is 90° as illustrated, the voltages 11 and 12 correspond to cartesian components. In order to be able to effect a transposition of the components with respect to the earth's magnetic north pole, the rod magnet 13 must be arranged parallel to one of the two equal sides of the triangle. A further embodiment of the arrangement of sensors as shown in FIG. 4 results in the arrangement shown in FIG. 5 where the coordinate transposition is oblique since the angle $\alpha$ is no longer a right angle.

In the two pickup system arrangements with three sensors, sensor 8.5 may be replaced by forming the portion of the shaft 7 which is adjacent to the sensors of metal or providing same with a metal coating. Eliminating this sensor 8.5 is possible if the voltages 1 and 2 are fed in in symmetry with respect to the zero potential, since then the potentials at sensors 8.6 and 8.7 can be evaluated in an electric evaluation circuit outside of the illustrated apparatus with reference to zero potential, so that in this special case only two additional sensors are required on the carrier 9 for the transposition.

Figure 5:
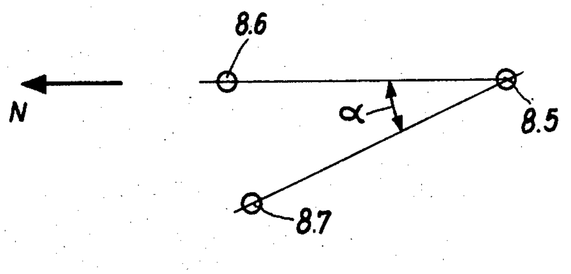
FIG. 5 illustrates a pickup system with three sensors for oblique coordinate transposition.
Figure 6:
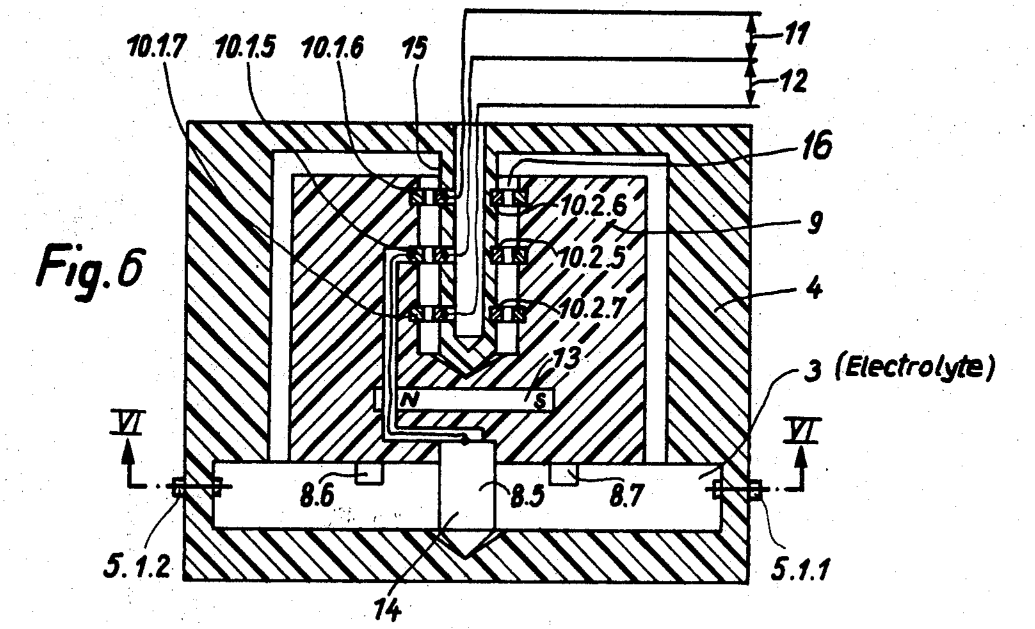
FIG. 6 is a schematic sectional elevation view of another embodiment of the apparatus according to the present invention using a pickup system with three sensors.
Figure 7:
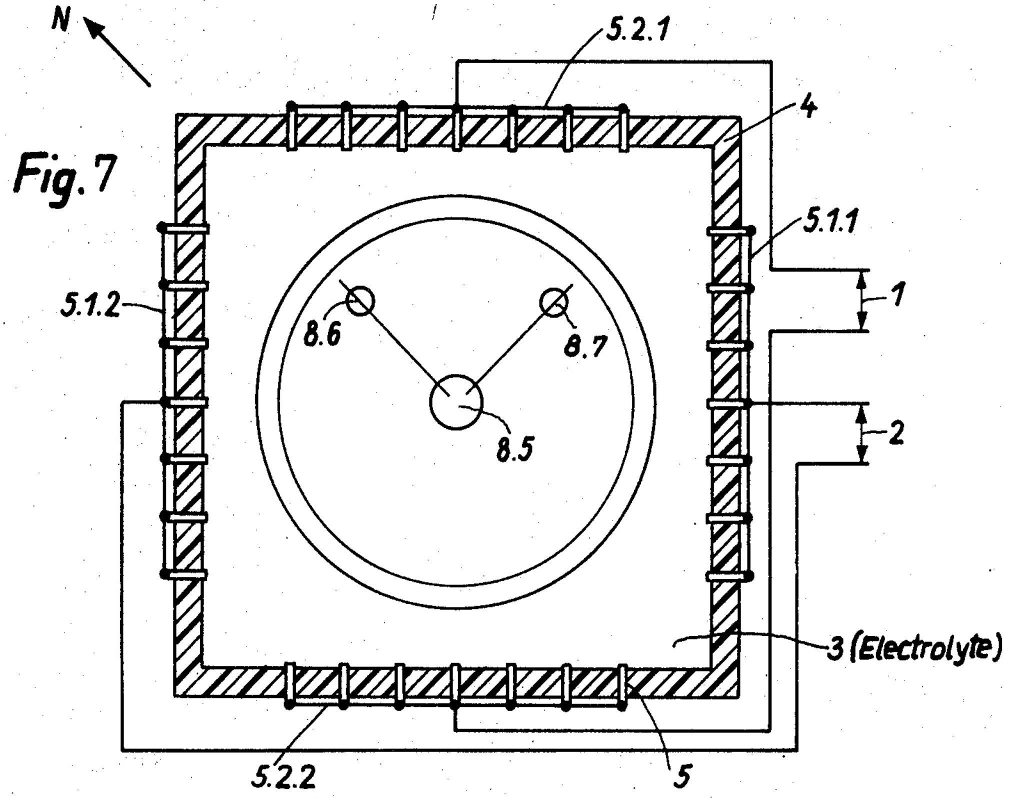
FIG. 7 is a sectional view of the apparatus of FIG. 6 along the line VI—VI.

FIGS. 6 and 7 show a modified embodiment of the apparatus of the present invention which is of advantage, for example, when, according to the sensor arrangements of FIG. 4 or 5, the sensor 8.5 coincides with the axis of the shaft 7 and voltages 1 and 2 are applied in symmetry with respect to zero potential. In this embodiment, portions of the apparatus which correspond to those of FIGS. 1 and 2 bear corresponding reference numerals.

The carrier 9' which accommodates, for example, the three sensors 8.5, 8.6, 8.7 according to FIG. 4 or 5, is rotatably mounted within the vessel 4' and is point-suspended at its center via a metal axle or shaft 14 which also serves as the sensor 8.5. A further nonmetallic or nonconductive axle or shaft 15 which is permanently connected with the vessel 4 forms the counter-bearing for the carrier 9' and extends into a bore 16 formed in the upper surface of carrier 9'. The wall of the carrier 9' within the bore 16 is provided with annular conductive decoupling elements 10.1.5 to 10.1.7 which are galvanically connected with sensors 8.5 to 8.7 respectively. The associated annular decoupling elements 10.2.5 to 10.2.7 respectively are mounted on the shaft 15. The decoupling elements 10.1.5, 10.2.5 associated with the center electrode 8.5 are arranged symmetrically in the center with respect to the two adjacent decoupling arrangements. The decoupling arrangements 10 are surrounded by the same electrolyte 3 in the bore 16 as the sensors 8.5 to 8.7. The potentials of the three sensors which are coupled out through electrolyte 3 are detected as voltages 11 and 12 between decoupling elements 10.2.5 and 10.2.6 and between decoupling elements 10.2.5 and 10.2.7 respectively always with reference to zero potential. The advantage in this specific arrangement is that an undersired coupling between the decoupling elements 10.1.6/10.2.6 and the decoupling elements 10.1.7/10.2.7 is attenuated by the zero potential lying symmetrically therebetween.

As indicated above with the three sensor arrangement shown in FIGS. 6 and 7, the rod magnet 13 mounted on the carrier 9' is arranged with its longitudinal axis parallel to a line drawn between or passing through sensor 8.5 and one of the other sensors, e.g., sensor 8.6.

It will be understood that the above description of the present invention is susceptible to various modifications, changes and adaptations, and the same are intended to be comprehended within the meaning and range of equivalents of the appended claims.

We claim:

1. Apparatus for reproducing a two-dimensional vector of cartesian components and for determining the transposed components of the vector in a transposed coordinate system with any desired given orientation in the plane of the reproduced vector comprising in combination:

an electrically nonconductive vessel filled with an electrolyte;

first and second pairs of perpendicularly aligned groups of linearly aligned adjacent rod-shaped electrodes mounted in the wall of said vessel and extending thereinto, the groups of electrodes in each pair being mounted in said wall of said vessel opposite one another with the respective alignment axes along the frontal faces of said electrodes facing the electrolyte being parallel, thereby to define an enclosed area in a plane within said vessel;

means for galvanically connecting the electrodes of each said group together outside of the electrolyte;

means for applying first and second voltages proportional to the two cartesian components of a vector to be reproduced to said first and second pairs of groups respectively so as to reproduce the vector in said plane;

pickup means, including at least three galvanically unconnected sensors located in the electrolyte for sensing the voltage potentials in said area within said plane;

means mounting said pickup means within said vessel for movement relative to said vessel so that said sensors can be oriented at will within said plane; and means for decoupling the potentials detected by said sensors from said vessel to provide the desired output voltages proportional to the transposed components of the reproduced vector as potential differences between a pair of said sensors.

2. The apparatus as defined in claim 1 wherein said mounting means comprises:

a structural unit including a nonmetallic plate-shaped carrier for said sensors which are mounted in a face of said carrier, and at least one axial extension; and means for supporting said unit in a point suspension in the center of said area for rotation about an axis perpendicular to said carrier and to said plane.

3. The apparatus as defined in claim 2 wherein said structural unit is constructed so that it has a degree of buoyancy in the electrolyte.

4. The apparatus as defined in claim 2 wherein said carrier is constituted by a plate of a material with the same specific electric conductivity as said electrolyte and is disposed in said plane; and wherein said sensors are mounted thereon in the form of metallic dots.

5. The apparatus as defined in claim 2 wherein said carrier is constituted by a nonmetallic plate disposed outside of said plane, and wherein said sensors are metallic rods which extend from said carrier into said plane parallel to said axis.

6. The apparatus as defined in claim 2 wherein said pickup means includes three sensors which are arranged so that each sensor is disposed at a different vertex of an isosceles triangle with the vertex of the angle between the two equal sides of said triangle lying in the center of said area; and wherein the potential differences determining the components of the transposed vector are detected between the sensor located at said vertex between the two equal sides of said triangle and each of the other two sensors.

7. The apparatus as defined in claim 6 wherein said angle between said two equal sides of said triangle is a right angle, whereby cartesian components are provided for the transposed vector.

8. The apparatus as defined in claim 6 wherein said axial extension is metallic and extends through the center of said area of said plane in which the vector is reproduced, and wherein said metallic extension comprises the said sensor located at the vertex of the angle between the two equal sides of the triangle.

9. The apparatus as defined in claim 2 wherein said pickup means includes four sensors which are arranged so that each sensor is disposed at a different corner point of a rectangle with the center of said rectangle lying in the center of said area; and wherein the potential differences determining the components of the transposed vector are detected between the pairs of diagonally opposite sensors.

10. The apparatus as defined in claim 9 wherein said rectangle is a square whereby cartesian components of the transposed vector are provided.

11. The apparatus as defined in claim 2 wherein said decoupling means comprises: a pair of associated decoupling elements for each of said sensors, one of the associated decoupling elements of each pair being annular, being mounted on said mounting means for rotation with said pickup means and being galvanically connected with one of said sensors, and the other decoupling element of each pair being fixed to the vessel; and an electrolyte for electrically coupling the associated decoupling elements together.

12. The apparatus as defined in claim 11 wherein only one electrolyte is used as the common fill for said vessel, said sensors and said decoupling means are disposed in said vessel, and the two associated decoupling elements of each pair are spaced a distance from one another through said electrolyte which is short compared to the path lengths in the electrolyte to the other said decoupling elements and to said sensors.

13. The apparatus as defined in claim 12 wherein said decoupling means is arranged symmetrically with respect to said plane for each two associated sensors.

14. The apparatus as defined in claim 2 wherein the orientation of said pickup means can be varied by turning said pickup means about its rotational axis.

15. The apparatus as defined in claim 14 wherein the orientation of said pickup means with respect to the earth's magnetic north pole is effected by a rod magnet which is rigidly connected to said carrier and has its longitudinal axis disposed parallel to said plane and to a line drawn between two associated sensors of said pickup means.

* * * * *